United States Patent

Lustig

[19]

[11] Patent Number: 6,062,762
[45] Date of Patent: May 16, 2000

[54] ANGLE JOINT FOR CHASSIS PARTS IN A MOTOR VEHICLE

[75] Inventor: Wilfried Lustig, Hüde, Germany

[73] Assignee: Lemförder Metallwaren AG, Germany

[21] Appl. No.: 08/317,679

[22] Filed: Oct. 5, 1994

[51] Int. Cl.[7] .................................................. F16B 13/00
[52] U.S. Cl. ........................ 403/270; 403/271; 403/272; 228/171; 228/173.4; 280/93.511
[58] Field of Search ................................ 228/171, 173.4; 280/673, 674, 675; 403/265, 270, 271, 272

[56] References Cited

U.S. PATENT DOCUMENTS

| 2,149,844 | 3/1939 | George | 403/272 X |
|---|---|---|---|
| 2,194,272 | 3/1940 | Blu | 228/173.4 X |
| 2,299,143 | 10/1942 | Hellwig | 403/270 |
| 2,387,154 | 10/1945 | Kalwitz | 228/173.4 X |
| 3,117,810 | 1/1964 | Hutton | 29/453 |
| 3,215,384 | 11/1965 | Chambers | 403/224 X |
| 4,202,484 | 5/1980 | Peterson | 403/271 X |
| 4,543,008 | 9/1985 | Salama et al. | 403/271 X |
| 4,586,840 | 5/1986 | Buhl | 403/228 |
| 4,618,163 | 10/1986 | Hasler et al. | 280/785 |
| 4,883,263 | 11/1989 | Buhl | 267/293 |

FOREIGN PATENT DOCUMENTS

| 154916 | 1/1953 | Australia | 280/673 |
|---|---|---|---|
| 668606 | 12/1938 | Germany | 403/270 |
| 118360 | 9/1979 | Japan | 228/173.4 |
| 6956 | 1/1981 | Japan | 403/271 |
| 163593 | 9/1983 | Japan | 228/173.4 |
| 212472 | 9/1986 | Japan | 228/173.4 |
| 11509 | 1/1992 | Japan | 280/673 |

OTHER PUBLICATIONS

Dorf, Richard C., Robotics and Automated Manufacturing, pp. 126–127, 1983.

Primary Examiner—Terry Lee Melius
Assistant Examiner—Andrea Chop
Attorney, Agent, or Firm—McGlew and Tuttle, P.C.

[57] ABSTRACT

An angle joint for chassis parts in a motor vehicle, especially a strut joint, in which a tubular housing, which is cylindrical on the outside, and a shaft, which has a profile adapted to the outer contour of the housing on the front side and partially surrounds the tubular housing, are welded together.

6 Claims, 2 Drawing Sheets

ANGLE JOINT FOR CHASSIS PARTS IN A MOTOR VEHICLE

FIELD OF THE INVENTION

The present invention pertains to an angle joint for chassis parts in a motor vehicle, especially to a strut joint, formed of a housing and an inner part, which is movably supported in the housing, with the two being able to be connected to different chassis parts, wherein the housing has a cylindrical interior and a shaft for fastening on the outer circumference.

BACKGROUND OF THE INVENTION

Such an angle joint has been known from DE 33,12,090-C2-. The housing in the prior-art arrangement is made in one piece with a threaded pin made of a forgeable material. The pin extends radially to the housing axis. The shaft consisting of a tube or a rod for connecting the housing to a chassis part is screwed onto the threaded pin on the housing directly or via an additional sleeve. Angle joints with a housing, which has a solid-forged or integrally cast pin for fastening the housing-side shaft end to the housing, have been known as well. Finally, fixed axle struts, in which the housing of an angle joint and the shaft are made in one piece, e.g., pressed together by friction welding or by applying other work processes under the action of heat, have been known. Undesired accumulations of material occur at the transition of the housing and the shaft in prior-art angle joints. The manufacturing cost of such an angle joint is correspondingly high.

SUMMARY AND OBJECTS OF THE INVENTION

It is an object of the present invention to design the housing and the shaft without compromising the operation-related requirements, with reduced weight, and to reduce the cost of manufacture of the housing and the shaft.

According to the invention, an angle joint for chassis parts in a motor vehicle is provided, particularly a strut joint. The joint comprises a housing and an inner part movably supported in the housing. The housing and the inner part can be connected to different chassis parts. The housing has a cylindrical interior and, on the outer circumference, a shaft for fastening. The housing is tubular and is cylindrical on its outside. A shaft which has a profile corresponding to the outer contour on the front side of the housing partially surrounds the tubular housing. The shaft and the housing are welded together. The tubular housing may be a cold-extruded tubular housing. The shaft may be a forged shaft or a cold-extruded shaft.

Due to the features of the present invention, the housing and the shaft are connected by contour welding along the lines of contact of the housing, which is cylindrical on the outside, and the shaft fitted to this contour on the facing front-side end. Robot welding ensures constant product quality of the welding to be performed. However, one advantage of the present invention is the fact that the joint housing has an absolutely cylindrical shape, so that it can be prepared from a tube section or as a cold-extruded part. This makes it possible to use inexpensive standard components, which are connected to one another by high-quality robot welding. The total weight can be reduced by about 25%, and a considerable cost reduction can be achieved compared with conventional designs.

According to special embodiments of the features of the present invention, a tubular housing and a tubular shaft or a cold-extruded tubular housing and a forged shaft are welded together. It is also possible to weld together a tubular housing and a cold-extruded shaft, or another combination of such design features.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
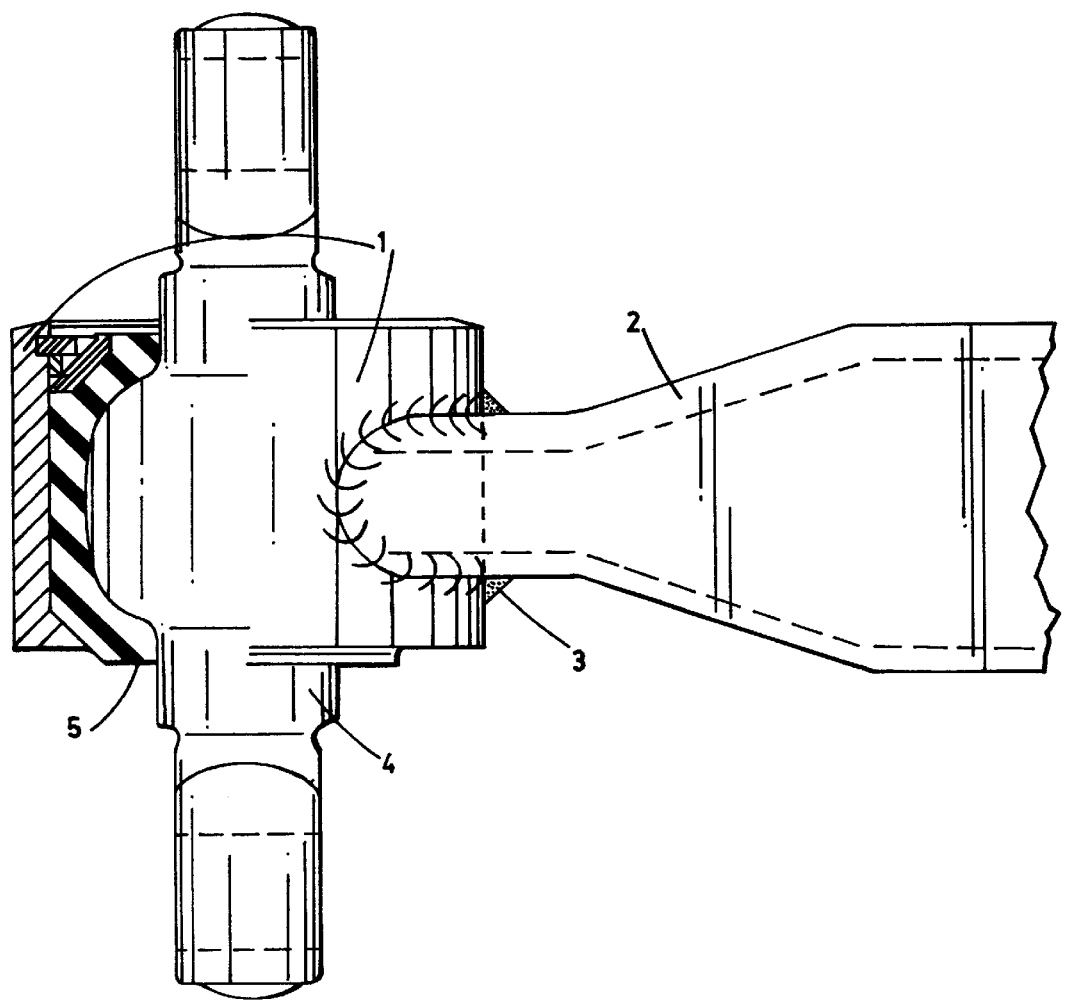
FIG. 1 is a view of an angle joint with partially cutaway housing.

Referring to the drawings in particular, the invention comprises a joint for chassis parts of a motor vehicle such as an angle joint and particularly a strut joint. The joint structure itself may be in the form of a molecular joint. An inner part 4 is arranged within a tubular housing 1. A body formed of elastomeric material 5 is interposed between the inner part 4 and the housing 1 such that joint movements in all directions are possible due to molecular deformation of the elastomeric body 5.

The inner part 4 extends out of the housing 1. Inner part 4 is provided with fastening ends on both sides. These fastening ends can be connected to a chassis part. The housing 1 is provided as a cylindrical element on the outside and the inside. Most preferably, and according to the preferred embodiment, the housing 1 is formed with a cylindrical inside and a cylindrical outside is provided. This may be in the form of a commercially-available tube section.

A shaft 2 is provided which extends radially to the joint axis. The shaft 2 is connected on an outer circumferential surface of the housing 1 by a weld seam 3.

Figure 2:
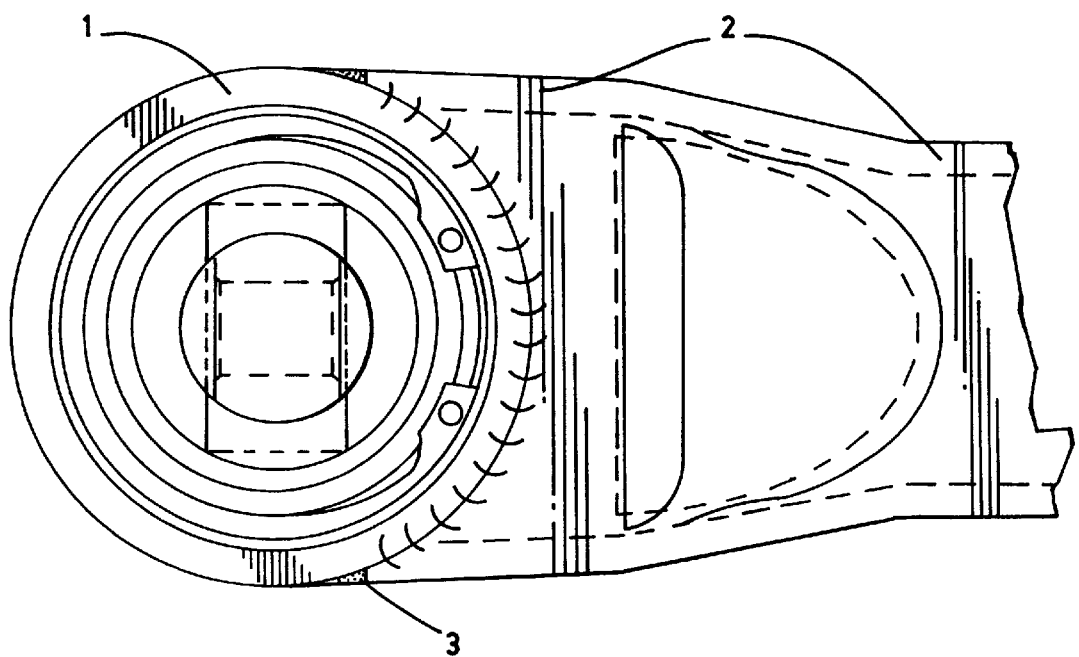
FIG. 2 is a side view offset by 90° compared with FIG. 1.

The front-side end of the shaft 2, the side-end that faces the housing 1, is fitted to the outer contour of the housing 1. A portion of the front-side end of the shaft 2 partially surrounds the housing 1 (FIGS. 1 and 2). The shaft 2 may also be made from a tube. The shaft 2 may also be prepared as a cold-extruded part, forged part or the like. The shaft 2 is welded to the housing 1. This is preferably by welding it to the outer circumferential surface of the housing 1. The welding takes place at a line of contact of the shaft 2, which is profiled on the front side for adaptation to the contour of the housing 1.

While a specific embodiment of the invention has been shown and described in detail to illustrate the application of the principles of the invention, it will be understood that the invention may be embodied otherwise without departing from such principles.

What is claimed is:

1. An angle joint for chassis parts in a motor vehicle, comprising:

a cold extruded tubular housing with open ends having a cylindrical interior and a cylindrical outer contour; an inner part movably supported within said housing, said housing and said inner part being connectable to different chassis parts; an elastomeric body disposed between said inner part and said tubular housing cylindrical interior for holding said inner part in said housing and allowing substantially universal movement of said inner part with respect to said housing; a forged shaft having an end with a profile corresponding to said outer contour of said housing, said profile partially surrounding said tubular housing, said shaft and said housing being welded together at said profile by contour welding following the line of contact between a peripheral edge of said profile and said outer contour of said housing.

2. An angle joint in accordance with claim 1, wherein:

said forged shaft is tubular, and said end of said tubular forged shaft is flattened to a shape having a dimension substantially equal to an external diameter of said cold extruded tubular housing.

3. An angle joint in accordance with claim 2, wherein:

said shape has another dimension less than an axial length of said cold extruded tubular housing.

4. An angle joint for chassis parts in a motor vehicle, comprising:

a cold extruded tubular housing with open ends having a cylindrical interior and a cylindrical outer contour; an inner part including a first fastening end extending out of one of said housing open ends and a second fastening end extending out of another of said housing open ends and a central ball shaped part, said housing and said inner part being connectable to different chassis parts; an elastomeric body disposed between said inner part and said tubular housing cylindrical interior for holding said inner part in said housing and allowing substantially universal movement of said inner part with respect to said housing; a forged shaft having an end with a profile corresponding to said outer contour of said housing, said profile partially surrounding said tubular housing, said shaft and said housing being welded together at said profile by contour welding following the line of contact between a peripheral edge of said profile and said outer contour of said housing.

5. An angle joint in accordance with claim 4, wherein:

said forged shaft is tubular, and said end of said tubular forged shaft is flattened to a shape having a dimension substantially equal to an external diameter of said cold extruded tubular housing.

6. An angle joint in accordance with claim 5, wherein:

said shape has another dimension less than an axial length of said cold extruded tubular housing.

* * * * *